Feb. 2, 1960 M. HIMMELHEBER ET AL 2,923,030
METHODS AND APPARATUS FOR PRODUCING
PRESSED WOOD-PARTICLE PANELS
Filed Oct. 5, 1953 6 Sheets-Sheet 1
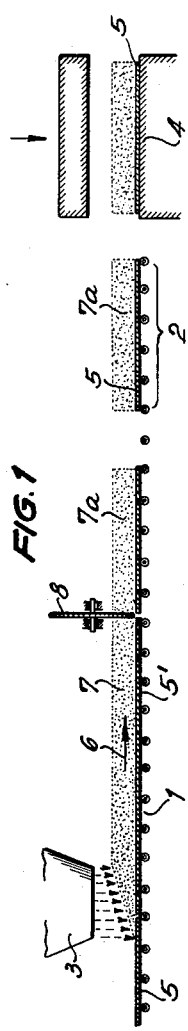
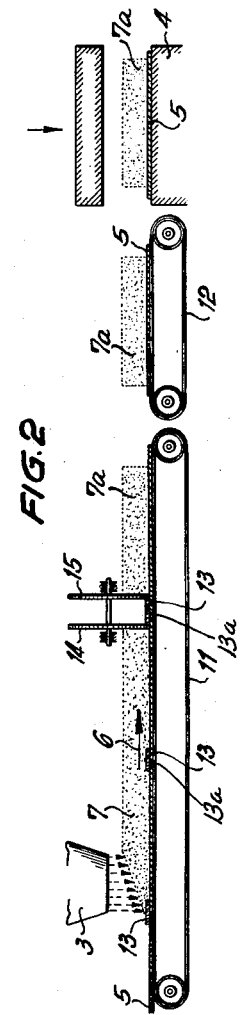
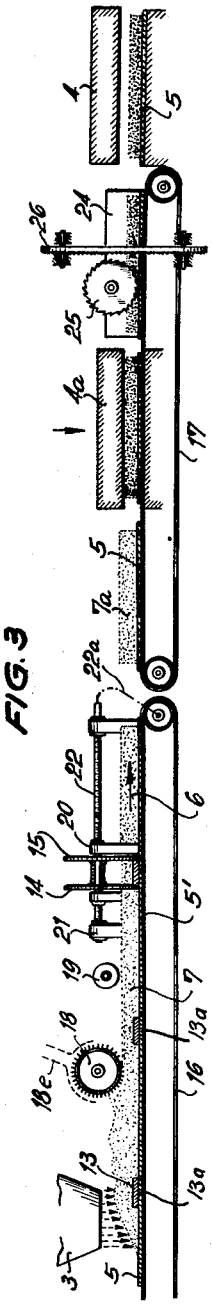

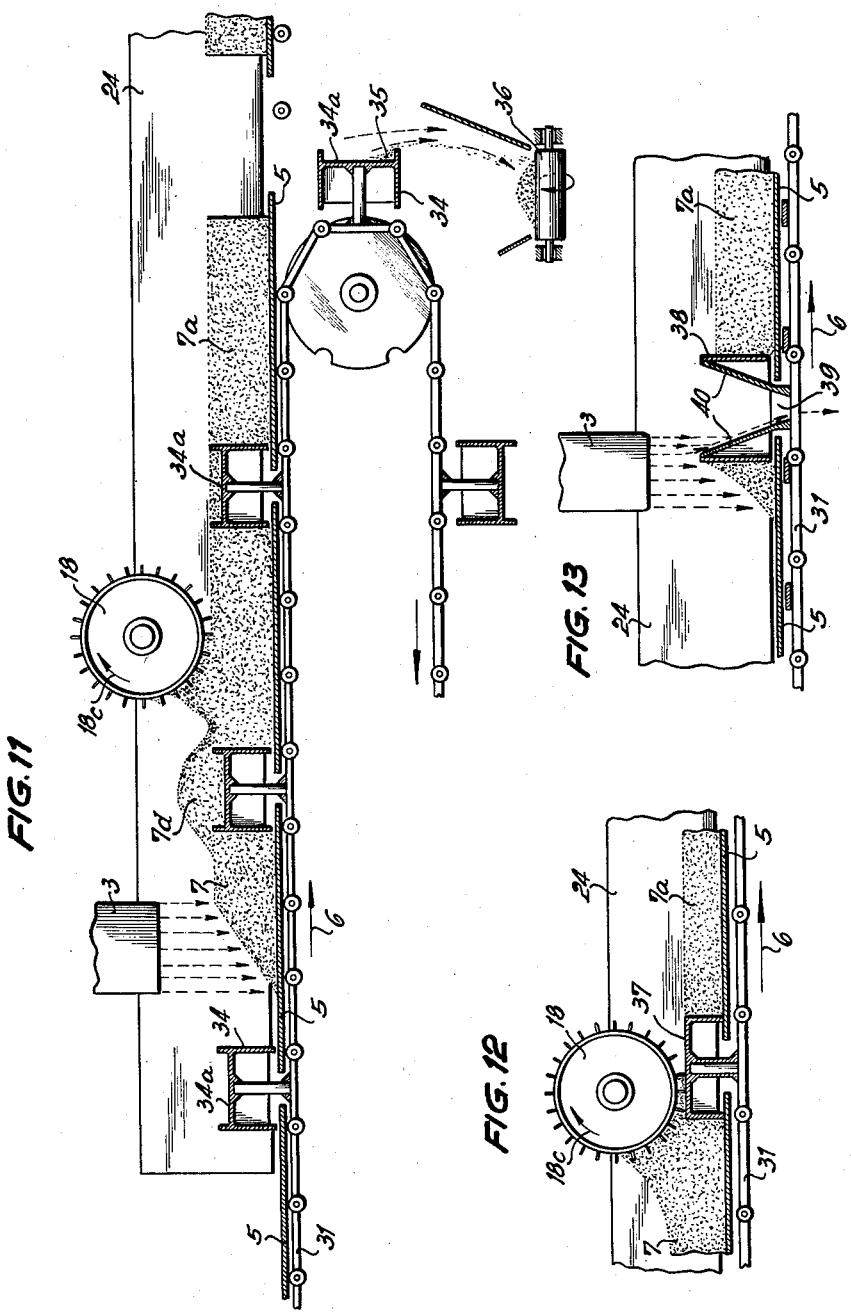

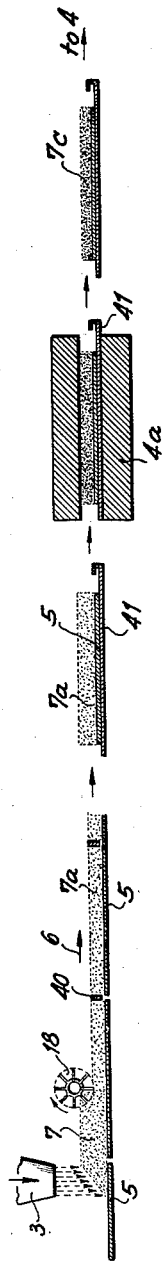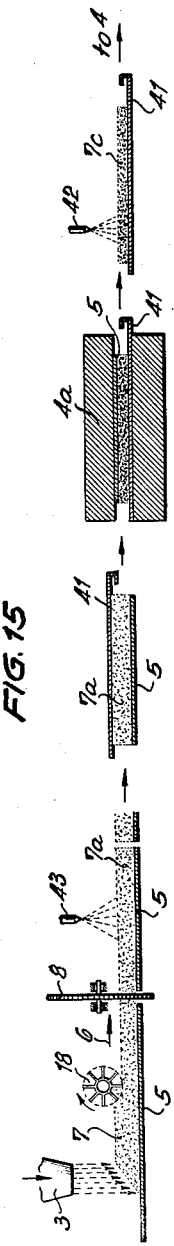

2,923,030

METHODS AND APPARATUS FOR PRODUCING PRESSED WOOD-PARTICLE PANELS

Max Himmelheber, Baiersbronn, Schwarzwald, Klaus Steiner, Bad Tolz, and Walter Kull, Freudenstadt, Germany, assignors, by mesne assignments, to Allwood Incorporated, Glarus, Switzerland, a corporation of Switzerland Application October 5, 1953, Serial No. 384,168

Claims priority, application Germany December 23, 1952

15 Claims. (Cl. 18—4)

Our invention relates to methods and apparatus for the manufacture of boards or panels from wood-particle material, and more particularly to the so-called "dry" manufacture of such products from binder-impregnated wood shavings that are first shaped to a mat and then condensed and solidified into a solid panel by subjecting the mat to pressing or hot pressing.

The conventional dry manufacture of wood-particle boards is a discontinuous one. The fibrous stock, consisting preferably of wood shavings and/or other fibrous organic materials, such as comminuted straw, reed, bamboo, wood scales and the like, is poured into a frame resting upon a metal sheet so as to cover the framed sheet area as uniformly as possible, and the properly dimensioned mat of interlaced particles remaining on the sheet after removal of the frame is passed into the press together with the sheet.

Attempts have been made to improve the economy of manufacture and the uniformity of the panel products by substituting the intermittent supply of stock onto individual supporting sheets by a continuous mat-forming method according to which the particle stock is continuously deposited upon a travelling endless conveyor belt. Thereafter the continuous mat of particles thus formed on the belt is cut into individual portions, and each of these portions is individually transferred from the conveyor belt onto a supporting metal sheet on which the mat portion is pressed into a panel, usually, in an intermittently operating press. The transfer of the mat portions from the conveyor to the supports of sheet metal is difficult and troublesome. The transfer is virtually impossible as long as the mat portion is still in its loosely deposited condition. It is necessary, therefore, to condense or pre-press the mat material prior to the transfer, and it has been found that even then the mat portions remain fragile and are apt to be damaged, aside from the fact that spacious and complicated devices are needed for effecting the transfer. If the pre-pressing is performed with intermittently operating presses, then it is also necessary to first cut the mat material to the proper length, and this requires composing the endless conveyor belt of individual belt sections between which the particle mat can be cut, thus involving an intricate conveyor design in addition to devices for re-transferring the pre-pressed mat portion onto the conveyor leading to the main press.

It is an object of our invention to obviate these disadvantages and to devise a manufacture that affords a continuous depositing and forming of a wood-particle mat and a subsequent transfer of properly dimensioned mat portions to the pressing machinery without the danger of the mat portions becoming damaged when being conveyed. Another object, akin to the foregoing, is to improve the economy of manufacture by minimizing the number of rejects due to damage occurring during the transfer, and by simplifying the machinery needed to effect the transfer. A further, optional object of our invention is to do away, if desired, with the above-mentioned intermittent pre-pressing of the mat portions.

To achieve these objects, and in accordance with a feature of our invention, we start the mat forming procedure by conveying a series of consecutive supporting plates, preferably of sheet-metal, through a mat forming station in which the series of sheets is continuously charged with wood particles so that a mat of particles is formed directly upon the travelling supports; and we cut or otherwise divide the travelling mat along the butt junctions or gaps of the supporting sheets into individual mat portions that are substantially or approximately coextensive with the respective sheets and remain supported by the sheets until the individual mat portions reach the pressing stage of the fabricating process or until after they have passed through the press.

Within this method, the individual sheet-metal supports of the series may abut against each other, and the particles may be deposited over the entire length, up to the abutting edges, of the supports. Then, however, caution is needed to prevent the panel press from becoming excessively soiled by wood particles falling off the supports when passing them into or out of the press. For that reason, and according to another feature of the invention, we prefer giving the sheet-metal supports a larger length in the travelling direction than required for the mat portions, and/or space the supports in that direction from each other. As a result, an amount of particle stock is deposited upon the marginal areas intermediate each two mutually adjacent supports, and this excess amount of stock is thereafter removed to be available for re-processing. The removal of the excess stock may be effected, for instance by severing the mat along two parallel cuts and thereafter removing the piece of mat thus cut off the remaining mat portions.

For facilitating the removal of the cut-off mat pieces, we prefer covering the marginal zones of the supports along the mutually adjacent edges with a cover structure, such as a strip of sheet metal, together with which the cut-off mat piece can be readily discarded.

The machinery needed for the above-described method according to the invention is considerably simpler than the manufacturing equipment heretofore used for the production of wood-particle boards according to the dry process. The machinery according to the invention comprises a conveyor, such as a belt conveyor of the endless type, which during continuous operation carries a series of sheet-metal supports through a mat forming station. The mat forming station is provided with a wood-particle supply device located above the travelling supports and extending across the width of their travelling path. This device continuously deposits a mat of stock upon the series of supports. Further provided are dividing means which sever the mat into a number of mat portions whose dimensions correspond substantially to those of the panels to be produced. The dividing means travel with the conveyor so that the subdivision is effected while the deposited stock is in continuous motion. The dividing means may consist of one or several saws whose carriage travels periodically with the conveyor to thereafter return to the initial position in order to repeat the cutting operation. The position of the saws or other dividing means is such that the lines of division extend close to the mutually adjacent edges of each two neighboring supports.

The foregoing objects and features of our invention will be apparent from, and will be desired in connection with the embodiments of our invention exemplified on the drawings.

Figs. 1 and 2 show schematically different modifications of the method according to the invention.

Fig. 3 shows a fabricating plant according to the invention.

Fig. 8 to 13 show different modifications respectively of the forming stage pertaining to a fabricating plant otherwise designed and operative in accordance with the embodiments of Figs. 1 to 7.

Figs. 14 and 15 show schematically two other examples of fabricating plants and are essentially explanatory of further modifications of the method according to the invention.

The same reference characters are used in the various illustrations for denoting respectively similar elements.

Figure 4:
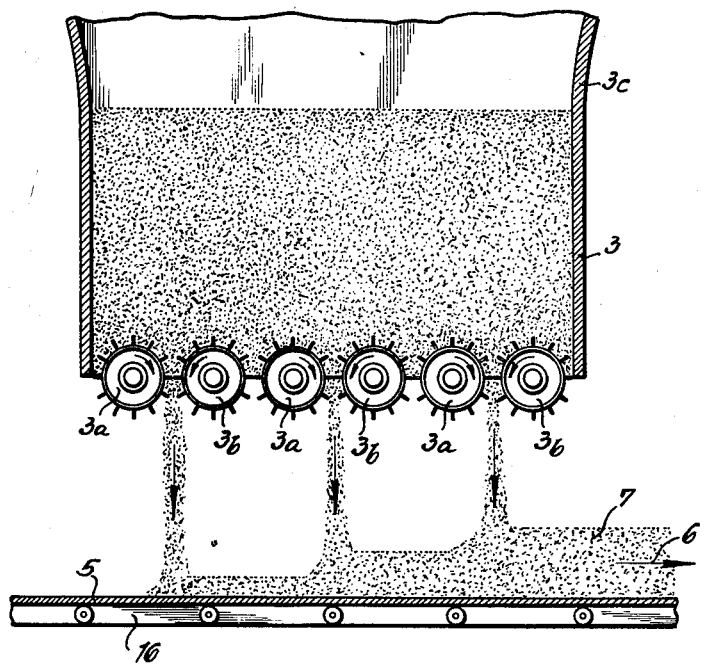
Figs. 4 to 7 illustrate different details respectively of the same plant.

The plant shown in Fig. 1 comprises a conveyor runway composed of a first conveyor 1 and an aligned second conveyor 2, both conveyors being shown as of the roller type. The rollers of conveyor 1 are driven at a slower speed than the rollers of conveyor 2. The conveyor 1 passes through a mat forming station equipped with a particle dispensing device 3. The complete conveyor runway extends from device 3 to an intermittently operating molding press 4. When in operation, the runway portion formed by conveyor 1 is substantially covered by a series of sheet-metal supports 5 which, in the embodiment of Fig. 1, almost abut against each other. The gap is indicated at 5'. The supports 5 travel slowly in the direction 6 beneath the supply device 3 from which they are loaded with a mat 7 of particle stock. A circular saw 8 travels periodically with the supports 5 in the conveying direction 6 and cuts through the continuous mat 7 at a place between two adjacent supports 5. As a result, a mat portion 7a is divided from the mat 7. When the cut is completed, the saw 8 moves back to its starting place and commences to cut the mat 7 ahead of the next following support 5.

When the most advanced support 5 with a mat portion 7a on conveyor 1 reaches the conveyor 2, the support is advanced at a higher speed toward and into the press 4. Consequently, the foremost support 5 and the mat portion 7a carried thereby are removed from the series of supports 5 remaining on the conveyor 1. The pressing operation is completed before the next individual support and mat portion reach the press 4.

It will be recognized that the mat is continuously formed on a series of supports and that the mat portions when cut from the rest of the mat remain on the same supports during the transfer from conveyor 1 to the press 4 as well as during the pressing operation. Upon completion of the pressing operation, the mat of wood particles is either formed into a solid panel or is sufficiently solidified for further fabrication, and the support 5 is now available for being returned to the starting point of the conveyor runway.

The particle stock is impregnated with a resinous or other binding agent before it reaches the bin or hopper of the supply device 3. The pressing operation in press 4 has the effect of condensing the particle stock thus reducing it to the desired thickness of the panel and solidifying it by virtue of the binder contained in the mat material. The pressing operation may involve a simultaneous application of heat for curing the binder, as customary in such processes. The proportion of binder per total weight of stock may amount up to about 8% and is usually below 5%.

In the modification according to Fig. 2, the two consecutive conveyors 11 and 12 are of the endless-belt type. The gaps 13a between adjacent edges of the supports 5 are covered by strips 13 of sheet metal. In further distinction from the embodiment of Fig. 1, the division of mat 7 into individual mat portions 7a is effected by means of two parallel saws 14 and 15 which are rotatably mounted on a common carriage and operate as described above with reference to the saw 8 of Fig. 1. The two saws 14 and 15 cut along the two edges of each individual cover strip 13 that extend transverse to the direction 6 of conveyor travel. Consequently, when the saws 14 and 15 have completed a cutting operation, an intermediate piece of mat, resting upon the cover strip 13, is severed from the mat 7 and can thereafter be removed by eliminating the cover strip 13 from the supports. In all other respects, the design and operation of the embodiment according to Fig. 2 are in accordance with the foregoing description of Fig. 1.

In the manufacture of pressed wood-particle panels, the supporting caul plates must be accessible at the edges in order to hold and convey them to and from the presses. When a single transverse cut is used for subdividing the originally continuous mat of particles, this cut must pass through the gap, or must be located above the gap, between two successively adjacent supporting plates. Hence, after severing of the mat, the caul plate cannot be gripped and conveyed without damage to the still loosely textured mat portion supported by that plate. Consequently, a subsequent grinding or other finishing operation would be necessary to restore a straight edge on the finished boards.

According to the invention, two parallel saws are provided so as to make two cuts along the two respective sides of the transverse gap between two adjacent caul plates. As a result the strip of mat severed and removed from the mat is wider than the gap, so that a marginal surface area remains bare on the caul plate and the supported, cut-off mat portion is set off from the edge of the plate. The plate therefore can readily be handled, by holding tools or other material-handling devices, without any need for such devices to touch the mat portion. As a result easier handling and better products are secured without necessity for subsequent finishing of the edges.

As will be explained in a later place with reference to Fig. 4, the stock supply device 3 can be given such a design and operation that the quantity of stock deposited on the supports is in accordance with that needed for the mat 7. However, we preferably conduct the method according to the invention in such a manner that continuously a larger quantity of stock is discharged onto the supports than correspond to the volume and thickness of the mat portions 7a. This requires providing the forming station with mechanical dosage control means, such as stripping or wiping members, which remove the excessive amount of stock down to the desired thickness of the mat, the removed amount of particles being returned into the supply device. The stripping members may consist of rotating spike drums, combs, rakes, tools similar to milling cutters or the like devices that are preferably adjustable as to their vertical spacing from the supports. The stripping means are located ahead of the transversely cutting saws.

The forming station may further be equipped with a pre-condensing or smoothing device consisting, for instance, of one or several rollers. The pre-condensing serves to exert only slight pressure upon the surface of the mat to somewhat condense its texture and smooth its surface prior to subjecting the mat to the cutting operation.

According to another feature of the invention, we trim the edges of the mat portions along the travelling direction by trimming devices such as saws during the conveying travel after the mat portions are severed from the rest of the mat. The trimming devices may be disposed along the runway beyond the conveyor that carries the series of sheet-metal supports through the forming station. However, the trimming devices may also be disposed between a pre-pressing machine and the main panel press, if the plant is equipped with pre-pressing machinery.

The manufacturing plant illustrated in Figs. 3 to 7 incorporates the just-mentioned features of the invention. The plant is equipped with two conveyors 16 and 17 of the endless-chain type. Conveyor 16 carries a series of supports 5 with intermediate cover strips 13 along a stock supply device 3. The mat 7 thus formed on the series of supports is transversely severed by two saws 14 and 15 as explained with reference to Fig. 2. The individual mat portions 7a then reach the conveyor 17 which passes them at higher speed toward the intermittently operating panel press 4.

The supply device 3 may be given a design as schematically illustrated in Fig. 4. This device has a hopper or bin 3c which is kept sufficiently filled with binder-impregnated particle stock. The bottom opening of the bin is substantially covered by a large number of roller pairs of which only three pairs are illustrated. The two rollers 3a and 3b of each pair revolve downwardly at their common tangential area. Consequently, a small amount of stock is discharged between the two rollers of each pair. Each roller extends across the entire width of the supports 5 and is provided with a large number of peripherally and axially distributed spikes which tear some of the material out of the mass contained in the bin. As a result, a uniform veil of wood particles is discharged between the rollers of each pair as the supports pass beneath the supply device at a uniform speed. The amount of discharged material can be regulated by varying the revolving speed of the rollers 3a and 3b. The individual discharges are super-imposed upon each other to form the mat 7.

As mentioned, the supply is preferably so regulated that the thickness of the deposited mat 7 is larger than desired of the mat portions 7a. The excess material is brushed or stripped from the mat by means of a raking device. According to the embodiment of Fig. 3, this device consists of a spike drum 18 which revolves at a peripheral speed much higher than the speed of conveyor travel. The rake drum 18 is shown to be upwardly covered by a housing 18e to which an exhaust blower may be connected for discharging the excess particles. Instead of providing for excess removal by exhaust, or preferably together therewith, the axis of rotation on device 18 may be located at an angle to the travelling direction (arrow 6) of the conveyor as is shown in Fig. 5.

Figure 5:
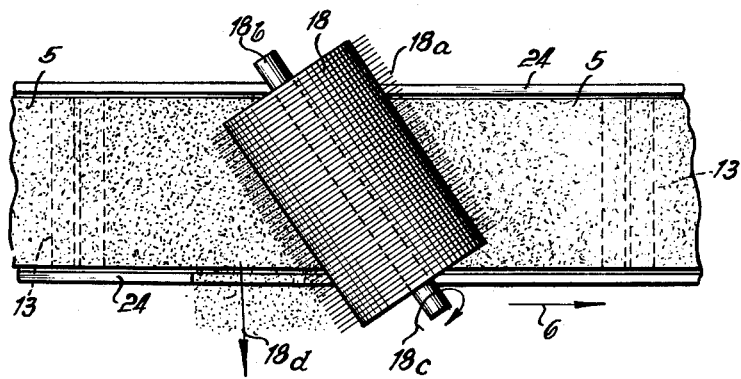

According to Fig. 5, the device 18 consists of a drum provided with a multitude of spikes 18a and mounted on a shaft 18b which extends at an angle to the conveyor direction 6. The sense of rotation of device 18 is represented by an arrow 18c. When rotating at high speed, the major amount of eliminated particles is thrown laterally off the supports 5 in the direction of the arrow 18d. As explained, the shaft 18b is preferably made vertically adjustable in order to vary the spacing of the drum from the supports 5 in accordance with any desired thickness of the mat portions.

The stripping device operates essentially as a means of giving the particles a proper dosage and of securing a uniform thickness of the mat portions to be pressed. This secures also the desired uniform weight of the panel products. The stripping device may also serve to impart to the mat portions a desired smooth and uniform surface condition. However, to improve the mat surface and also for somewhat condensing the mat texture, the plant shown in Fig. 3 is further equipped with a condensing roller 19 that extends transversely of the mat and is located between the stripping device 18 and the saws 14, 15.

The saws 14 and 15 are revolvably mounted on a carriage 20 which is displaceable upon a stationary supporting structure 21 in the conveying direction by means of a transmission schematically represented by a screw spindle 22 geared to the drive of conveyor 16 as indicated by a dot-and-dash line 22a. During the cutting operation of saws 14 and 15, the transmission 22 moves the saws in the conveying direction at the conveying speed. Upon completion of the cut, the transmission returns the saws to the original position by suitable reversing means (not illustrated).

The mat portions 7a, when reaching the second conveyor 17 are rapidly advanced into an intermittently operating press 4a.

While in the plants according to Figs. 1 and 2 the press denoted by 4 may consist of a pre-press or, for instance, of a single-stage hot press such as a high-frequency-heated plunger press, the pressing device 4a shown in Fig. 3 serves to perform a preliminary pressing operation for densifying the mat portion prior to the main pressing operation. As a rule, the pre-press 4a is not heated. After leaving the pre-press 4a, the partially compressed mat portions pass on a conveyor 17 into the main panel press 4 consisting of a single-stage hot press, or of a multiple-stage press with heated press plates and the pertaining charging and discharging accessories.

While passing from pre-press 4a to main press 4, the mat portions 7a pass through edge-trimming devices which comprise two saws 25 and 26 that cut along the edges of the supports 5 in the direction of conveyor travel. While we consider it preferable to locate the edge-trimming device between the pre-press and the main press, it will be understood that the edge-trimming operation may also be performed at a different point of the runway, for instance, ahead of or shortly subsequent to the mat-severing operation.

According to another feature of the invention, the conveyor at which the edge-trimming devices are located has preferably a total width larger than that of the sheet-metal supports 5 and forms a small gap on both respective sides of the supports in the conveying direction. This laterally extended conveyor assembly is charged with particle stock over its entire width so that the mat leaving the forming station is wider than the supports 5. When the mat portions cut from this mat travel through the trimming devices, the trimming tools passing through the above mentioned gaps trim the lateral margin off the remaining mat portions while these portions are still carried by the sheet-metal support on the conveyor.

According to a more specific feature of the invention, the just mentioned conveyor assembly is formed by an endless main conveyor whose width corresponds to that of the sheet-metal supports and by two lateral conveyors which form extensions of the main conveyor surface but are spaced therefrom so as to form a narrow gap traversed by the edge-trimming tools.

Figure 7:
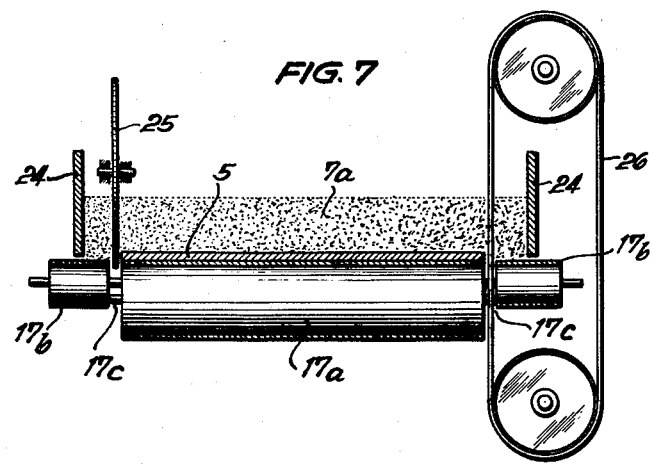
Figure 8:
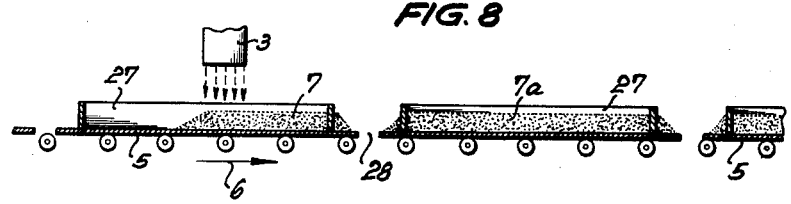
Figure 9:
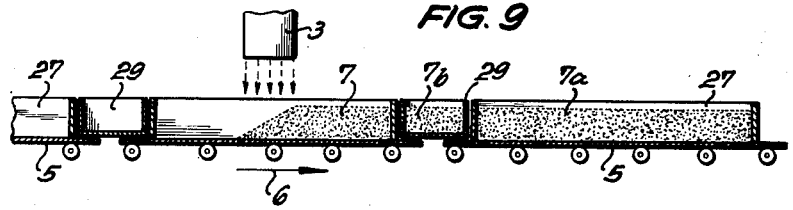
Figure 10:
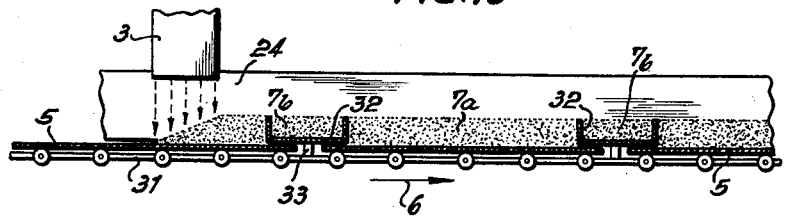

The above-mentioned features are embodied in the edge-trimming devices of the plant according to Fig. 3 and are separately illustrated in Fig. 7.

According to Fig. 7, the conveyor 17 is composed of a main conveyor 17a whose width corresponds to that of the sheet-metal supports 5. The top surface of conveyor 17a is laterally extended by narrow conveyors 17b so that two gaps 17c are formed between main conveyor 17a and respective lateral conveyors 17b. The mat-forming stock covers the entire active width of the conveyor surface between border walls 24. A circular saw 25 and an endless band saw 26 pass through the respective gaps 17c, and trim the edges of the mat portion 7a while this portion is passing through the trimming station. The amount of stock trimmed off by the saws 25 and 26 may be removed from the lateral conveyors 17b to be returned into the fabricating process.

Figure 6:
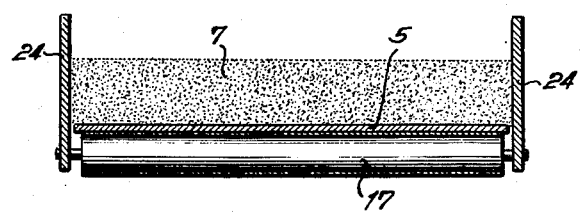

The just-mentioned lateral walls 24 may extend over the entire length or most of the length of the runway and may also be provided on both respective sides of the first conveyor 17 as is apparent from Fig. 6. The walls 24 are either stationary or they may travel with the conveyor.

The operating rhythm of the presses 4a and 4 is preferably such that a mat portion is being trimmed and introduced into the hot press 4 while the next following mat portion is being introduced into the pre-press 4a.

The cover strips 13 may be manually placed upon the supports 5 before the supports pass beneath the supply device 3. After each mat portion 7a is divided from the rest of the mat, the cover strips 13 may be manually removed. However, these operations may also be effected automatically and mechanically, for instance by connecting or coupling the cover strips with the endless conveyor.

A pressing plate, not shown, may be placed upon the top of the individual mat portions 7a. The assembly may thereafter be reversed and then introduced into the press 4a. If desired, the original support 5 may first be removed prior to passing the reversed assembly into the press. The opposite surfaces of the mat portion may be sprayed with surface moistening material, or an additional amount of resinous or other binder may be applied to obtain a desired surface condition of the panel.

As apparent from the various embodiments described in the foregoing, the invention is amenable to various and diversified modifications, and it will be obvious to those skilled in the art upon a study of this disclosure that the invention may be given embodiments other than those specifically illustrated and described, without departing from the essential features of the invention and within the scope of the claims annexed hereto.

We claim:

1. The method for the continuous production of pressed wood-particle panels, which comprises the steps of progressively conveying a sequence of flat supports and continuously charging a supply of wood particles onto the traveling supports, shaping on said sequence of supports a continuous mat from said particles, thereafter dividing the mat during its travel and transverse to the travel direction into individual mat portions and into intermediate mat pieces by severing the mat each time along two lines that are parallel to the gap between the respective edges of each two adjacent supports, said two lines of severance being located on both sides respectively of said gap so that each intermediate mat piece overlaps respective marginal surface areas of said two supports, discarding said intermedaite mat pieces, and compressing each individual separated mat portion on an individual support to form a solid panel from said mat portion.

2. The method for the continuous production of pressed wood-particle panels, which comprises the steps of progressively conveying a series of sheet-like supports and charging at a given travel location a larger quantity of wood particles onto the traveling supports than is required in the desired panels, eliminating a portion of said particles from the traveling supports to thereby produce a mat of substantially uniform thickness, precondensing the mat by slight surface pressure, cutting the mat along two lines parallel to the gap between each two adjacent supports whereby the mat is divided into individual mat portions and intermediate mat pieces, said two cutting lines being located on both sides respectively of the gap so that each of said mat pieces overlaps respective marginal surface areas of said two supports, eliminating said mat pieces whereby the mat is divided into mutually spaced mat portions each being carried by one of said respective supports and shorter than said support, removing each most advanced support from the series together with the mat portion carried by said support, and thereafter subjecting the mat portion on said removed support to hot pressing to form a panel.

3. The method for the continuous production of pressed wood-particle panels, which comprises the steps of progressively conveying a substantially horizontal sequence of supports having gaps therebetween, placing bridging strips over the gaps, and continuously charging a supply of wood particles onto the traveling supports and strips, shaping on said sequence of supports and strips a continuous mat from said particles, thereafter dividing the shaped mat during its horizontal travel and transverse to the travel direction into individual mat portions and into intermediate mat pieces by severing the mat each time along two lines but offset from the gap between the respective edges of each two adjacent supports, said two lines of severance being located on both sides respectively of each strip so that each intermediate mat piece overlaps respective marginal surface areas of said two supports, discarding said intermediate mat pieces and bridging strips, and compressing each severed mat portion on its individual support to form a solid panel from said mat portion.

4. Apparatus for the production of pressed wood-particle panels, comprising first, substantially horizontal, conveyor means, a series of support plates carried on said conveyor means when in operation, wood-particle discharging means disposed above said support plates to deposit thereon a mat of particles, severing means mounted for travel conjointly with said first conveyor means and for passing across said support plates near the transverse edges of said support plates, operative to sever said horizontally traveling mat near but offset from two adjacent transverse edges of mutually adjacent support plates, into individual mat portions, said severing means having in the conveying direction a width overlapping respective marginal surface areas of two mutually adjacent support plates whereby said mat portions are shorter forwardly and rearwardly than said respective support plates, panel press means spaced from said first conveyor means in the traveling direction of said first conveyor means for forming said individual mat portions into respective panels, and second conveyor means extending from said first conveyor means to said press means for removing an individual mat portion and its support plate away from the rest of said mat and toward said panel press means.

5. Apparatus for the production of pressed wood-particle panels, comprising first conveyor means, a series of supports placed upon said conveyor means when in operation, cover strips placed upon said supports near the transverse edges thereof, each of said strips covering the gap between two adjacent ones of said supports and overlapping respective marginal surface areas of said two supports, wood-particle discharge means located above said supports to deposit a mat of particles on said supports, a double saw device mounted for travel with said conveyor means and having two parallel saws movable across said supports along the edges of each of said respective cover strips and operative to sever the mat near the transverse edges of the supports into individual mat portions and into intermediate waste portions removable by removing said cover strips, panel press means spaced from said first conveyor means in the traveling direction of said first conveyor means for forming said individual mat portions into respective panels, and second conveyor means extending from said first conveyor means to said press means and having a higher traveling speed than said first conveyor means for removing an individual mat portion and its support away from the rest of said mat and toward said panel press means.

6. Apparatus for the production of pressed wood-particle panels, comprising first conveyor means, a series of support plates placed upon said conveyor means when in operation, wood-particle discharging means disposed above said support plates to deposit thereon a mat of particles, particle-removing means disposed above said conveyor and extending across said support plates in vertically spaced relation thereto for reducing the deposit to a desired uniform thickness, mat dividing means comprising a double saw device having two blades mounted for conjoint travel with said first conveyor means and for passing across said support plates near the transverse edges of said support plates, and operative to sever the mat adjacent the transverse edges of said support plates into individual mat portions, said double saw device having in the conveying direction a width overlapping respective marginal surface areas of two mutually adjacent ones of said support plates whereby said mat portions are shorter forwardly and rearwardly than said respective support plates, panel press means spaced from said first conveyor means in the traveling direction of said first conveyor means and operative to form said individual mat portions into respective panels, and second conveyor means extending from said first conveyor means to said press means and having a higher traveling speed than said first conveyor means for removing an individual mat portion and its support plate away from the rest of said mat and toward said panel press means.

7. The apparatus defined in claim 5, and stripper means for removing excess wood particles from the top of the mat before it reaches the severing means, comprising a rotating picker drum mounted above the mat with its axis parallel to the mat surface but at an angle to its direction of advance, the surface of the drum adjacent the mat moving in a direction counter to said advance.

8. Apparatus for the production of pressed wood-particle panels, comprising first conveyor means, a series of supports placed upon said conveyor means when in operation, cover strips placed upon said supports near the transverse edges thereof, each of said strips covering the gap between two adjacent ones of said supports and overlapping respective marginal surface areas of said two supports, wood-particle discharge means to deposit a mat of particles on said supports, a double saw device mounted for travel with said conveyor means and comprising two parallel saws movable across said supports along the edges of each of said respective cover strips and operative to sever the mat along but offset from the transverse edges of said support plates, into individual mat portions and into intermediate waste portions removable by removing said cover strips, panel press means spaced from said first conveyor means in the traveling direction of said first conveyor means for forming said individual mat portions into respective panels, and second conveyor means extending from said first conveyor means to said press means and having a higher traveling speed than said first conveyor means for removing an individual mat portion and its support away from the rest of said mat and toward said panel press means, one of said conveyor means comprising a main conveyor section and two lateral conveyor sections disposed on both sides respectively along said main section and having the same traveling speed as said main section, said lateral conveyor sections and said main conveyor section forming together two gaps along said main conveyor section and having together a total width larger than the width of said supports, and edge-trimming tool means passing through said respective gaps and engageable with the mat material on said supports for trimming the mat edges along the conveyor traveling direction.

9. Apparatus for the production of pressed wood-particle panels, comprising conveyor means, a series of supports carried upon said conveyor means, wood-particle discharging means to deposit a mat of particles on said supports, transverse severing means comprising two transversely directed blades operative to sever the mat along two lines that are along but offset from adjacent transverse edges of two mutually adjacent supports, said blades being offset from each other, in the conveying direction, a distance sufficient to overlap respective marginal surface areas of said two mutually adjacent supports, whereby the resulting mat portions are shorter forwardly and rearwardly than said respective supports, and press means for receiving said mat portions and forming them into panels.

10. Apparatus for the production of pressed wood-particle panels, comprising conveyor means, a longitudinal series of support plates carried upon said conveyor means, bridging means over gaps between the plates, wood-particle discharging means to deposit a mat of particles on said support plates and bridging means, transverse severing means comprising two blades longitudinally offset from each other and operative to sever the mat near but offset from the transverse edges of the bridging means, into individual mat portions, the offset of the blades being greater than the width of the bridging means in the conveying direction, to overlap respective marginal surface areas of two mutually adjacent support plates, whereby said mat portions are shorter forwardly and rearwardly than said respective support plates, and press means for receiving said mat portions and forming them into panels.

11. Apparatus for the production of pressed wood-particle panels, comprising first conveyor means, a series of supports placed upon said conveyor means when in operation, wood-particle discharging means disposed above said supports to deposit thereon a mat of particles, double bladed severing means mounted for conjoint travel with said first conveyor means and for passage across said supports near the transverse edges of said supports, and operative to sever the traveling mat near the transverse edges of the support plates into individual mat portions, said double bladed severing means having in the conveying direction a width overlapping respective marginal surface areas of two mutually adjacent supports, said double bladed severing means comprising two rotary saw blades which are offset from each other in the conveying direction by a distance at least sufficient to overlap adjacent transverse edges of the said adjacent supports, whereby said mat portions are shorter forwardly and rearwardly than said respective supports, panel press means spaced from said first conveyor means in the traveling direction of said first conveyor means operative to form said mat portions into respective panels, and second conveyor means extending from said first conveyor means to said press means and operative for removing an individual mat portion and its support away from the rest of said mat and toward said panel press means, one of said conveyor means comprising a main conveyor section and two lateral conveyor sections disposed on both sides respectively along said main section and having the same traveling speed as said main section, said lateral conveyor sections and said main conveyor section forming together two gaps along said main conveyor section and having together a total width larger than the width of said supports, and edge-trimming tool means passing through said respective gaps and engageable with the mat material on said supports for trimming the mat edges along the conveyor traveling direction.

12. Apparatus for the protection of pressed wood-particle panels, comprising first, substantially horizontal, conveyor means, a series of support plates carried on said conveyor means when in operation, wood-particle discharging means disposed above said support plates to deposit thereon a mat of particles, severing means mounted for travel with said first conveyor means and for passing across said support plates near the transverse edges of said support plates, and operative to sever said horizontally traveling mat along but offset from the transverse edges of the support plates, into individual mat portions, said severing means having in the conveying direction a width overlapping respective marginal surface areas of two mutually adjacent support plates whereby said mat portions are shorter forwardly and rearwardly than said respective support plates, panel press means spaced from said first conveyor means in the traveling direction of said first conveyor means for forming said individual mat portions into respective panels, and second conveyor means extending from said first conveyor means to said press means for removing an individual mat portion and its support plate away from the rest of said mat and toward said panel press means, one of said conveyor means comprising a main conveyor section and two lateral conveyor sections disposed on both sides respectively along said main section and having the same traveling speed as said main section, said lateral conveyor sections and said main conveyor section forming together two gaps along said main conveyor section and having together a total width larger than the width of said supports, and edge-trimming tool means passing through said respective gaps and engageable with the mat material on said supports for trimming the mat edges along the conveyor traveling direction.

13. Apparatus for the production of pressed wood-particle panels, comprising first, substantially horizontal, conveyor means, a series of support plates carried on said conveyor means when in operation, wood-particle discharging means disposed above said support plates to deposit thereon a mat of particles, severing means mounted for travel with said first conveyor means and for passing across said support plates near the transverse edges of said support plates, and operative to sever said horizontally traveling mat along but offset from the transverse edges of the support plates, into individual mat portions, said severing means having in the conveying direction a width overlapping respective marginal surface areas of two mutually adjacent support plates whereby said mat portions are shorter forwardly and rearwardly than said respective support plates, panel press means spaced from said first conveyor means in the traveling direction of said first conveyor means for forming said individual mat portions into respective panels, and second conveyor means extending from said first conveyor means to said press means for removing an individual mat portion and its support plate away from the rest of said mat and toward said panel press means, one of said conveyor means comprising an endless main conveyor and two endless lateral conveyors parallel to said main conveyor and forming therewith two gaps in the conveyor travel direction, and two edge-trimming saws passing through said respective gaps and cuttingly engageable with the mat material on said supports.

14. Apparatus for the production of pressed wood-particle panels, comprising first substantially horizontal conveyor means, a series of flat-surface supports placed upon said conveyor means when in operation, there being gaps between the supports, bridging strips across the gaps, wood-particle discharging means to deposit a mat of particles on the supports, severing means mounted for travel with said first conveyor means and for passing across said supports near the transverse edges of said supports, and operative to sever said horizontally traveling mat near the transverse edges of the support plates into individual mat portions, said severing means having in the conveying direction a width overlapping respective marginal surface areas of two mutually adjacent ones of said supports whereby said mat portions are shorter forwardly and rearwardly than said respective supports, said width being at least as wide as the bridging strips, panel press means spaced from said first conveyor means in the traveling direction of said first conveyor means and operative to form said individual mat portions into respective panels, and second conveyor means extending from said first conveyor means to said press means for removing an individual mat portion and its support away from the rest of said mat and toward said panel press means.

15. Apparatus for the production of pressed wood-particle panels, comprising conveyor means, a series of removable support plates carried by said conveyor means, wood-particle discharging means disposed above said support plates to deposit thereon a mat of particles, double bladed transverse severing means mounted for travel with said first conveyor means and for passage transversely across said mat and operative to sever the traveling mat along two lines near but offset from transverse edges of two mutually adjacent support plates into individual mat portions, said double bladed severing means having in the conveying direction a width overlapping respective marginal surface areas of two mutually adjacent support plates whereby said mat portions are shorter forwardly and rearwardly than said respective support plates, panel press means spaced from said conveyor means in the traveling direction of said conveyor means for receiving said mat portions and forming them into respective panels.

References Cited in the file of this patent

UNITED STATES PATENTS

| | | |
|---|---|---|
| 2,230,880 | Brown | Feb. 4, 1941 |
| 2,238,017 | Duncan | Apr. 8, 1941 |
| 2,320,702 | Marchese et al. | June 1, 1943 |
| 2,538,972 | Magnani | Jan. 23, 1951 |
| 2,583,618 | Weyerhaeuser | Jan. 29, 1952 |
| 2,601,349 | Welsh | June 24, 1952 |
| 2,689,975 | Leng | Sept. 28, 1954 |